US010625725B2

(12) United States Patent
Arienti et al.

(10) Patent No.: US 10,625,725 B2
(45) Date of Patent: Apr. 21, 2020

(54) AUTOMATIC CONTROL BRAKING SYSTEM FOR VEHICLES

(71) Applicant: FRENI BREMBO S.P.A., Curno, Bergamo (IT)

(72) Inventors: Roberto Arienti, Curno (IT); Carlo Cantoni, Curno (IT); Andrea Odoni, Curno (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 41 days.

(21) Appl. No.: 16/067,172

(22) PCT Filed: Dec. 22, 2016

(86) PCT No.: PCT/IB2016/057940
§ 371 (c)(1),
(2) Date: Jun. 29, 2018

(87) PCT Pub. No.: WO2017/115244
PCT Pub. Date: Jul. 6, 2017

(65) Prior Publication Data
US 2019/0009763 A1 Jan. 10, 2019

(30) Foreign Application Priority Data
Dec. 29, 2015 (IT) .................. 102015000088593

(51) Int. Cl.
*B60T 8/40* (2006.01)
*B60T 13/62* (2006.01)
(Continued)

(52) U.S. Cl.
CPC .............. *B60T 13/62* (2013.01); *B60T 7/085* (2013.01); *B60T 8/38* (2013.01); *B60T 8/4077* (2013.01);
(Continued)

(58) Field of Classification Search
CPC .... B60T 8/4077; B60T 8/4081; B60T 13/142; B60T 13/146; B60T 13/62; B60T 13/686;
(Continued)

(56) References Cited

U.S. PATENT DOCUMENTS 6,024,421 A 2/2000 Sinnl
8,939,519 B2* 1/2015 Masuda ................ B60T 13/142
303/114.1

(Continued)

FOREIGN PATENT DOCUMENTS

DE 19549082 A1 7/1997
DE 102011085273 A1 5/2012
WO 2015/078651 A1 6/2015

OTHER PUBLICATIONS

European Patent Office, International Search Report with Written Opinion issued in PCT/IB2016/057940, dated Mar. 16, 2017, 16 pages, European Patent Office, Rijswijk, Netherlands.

*Primary Examiner* — Thomas W Irvin
(74) *Attorney, Agent, or Firm* — Marshall & Melhorn, LLC

(57) ABSTRACT

A braking system for vehicles having a master cylinder, and at least one braking device. The master cylinder may be provided with a first and a second output circuit, containing respectively a first and second brake fluid. The first output circuit may be fluidically connected to a braking simulator and the second output circuit may be fluidically connected to the at least one braking device for its actuation. An automatic hydraulic actuation unit operatively connected to the master cylinder by a hydraulic actuation circuit traversed by an actuation fluid distinct from the first and second brake fluid may be provided. A processing and control unit of the system that supervises the operation of the braking systems may also be provided.

15 Claims, 3 Drawing Sheets

(51) Int. Cl.
  *B60T 8/38*    (2006.01)
  *B60T 7/08*    (2006.01)
  *B60T 13/68*   (2006.01)
  *B60T 7/04*        (2006.01)
  *B60T 11/16*       (2006.01)

(52) U.S. Cl.
  CPC .......... *B60T 8/4081* (2013.01); *B60T 13/686* (2013.01); *B60T 7/042* (2013.01); *B60T 11/16* (2013.01); *B60T 2270/404* (2013.01); *B60T 2270/82* (2013.01)

(58) Field of Classification Search
  CPC .... B60T 7/085; B60T 7/042; B60T 2270/404; B60T 2270/82
  See application file for complete search history.

(56) References Cited

U.S. PATENT DOCUMENTS

| | | | |
|---|---|---|---|
| 9,428,167 B2* | 8/2016 | Sakata | B60T 13/58 |
| 9,545,904 B2* | 1/2017 | Masuda | B60T 13/147 |
| 2012/0247100 A1* | 10/2012 | Yamasoe | B60T 8/4077 |
| | | | 60/553 |
| 2013/0127238 A1* | 5/2013 | Masuda | B60T 13/142 |
| | | | 303/6.01 |
| 2013/0127241 A1* | 5/2013 | Sakata | B60T 13/58 |
| | | | 303/14 |
| 2013/0318963 A1 | 12/2013 | Masuda | |

\* cited by examiner

AUTOMATIC CONTROL BRAKING SYSTEM FOR VEHICLES

FIELD OF APPLICATION

This invention relates to an automatic control braking system for vehicles.

STATE OF THE ART

In particular, the diffusion of kinetic energy recovery systems (KERS), increasingly powerful on racing cars, has necessitated the diffusion of systems able to automatically "mix" regenerative and dissipative braking. Regenerative braking is precisely the one that allows the recovery of energy during braking by converting the kinetic energy lost by the vehicle into electricity energy to be recovered and/or stored; dissipative braking is, instead, that "traditional" one that consists in converting/dissipating the kinetic energy of the vehicle as thermal energy, i.e., the heating of the brakes, which are typically disc brake callipers, pads and brake discs.

These systems actuate the traditional (or dissipative) braking system by means of "Brake By Wire" actuators: in other words, the user does not directly control the braking devices by directly operating a lever or pedal that puts pressure on the system fluidically connected to such braking devices, but the braking requested by the user, exerted by the actuation of a lever or pedal, is read and converted into the corresponding actuation of the braking devices by the related actuators.

The reduced actuation times (0.1-0.2 s to reach maximum pressure in the braking system) mean that these actuators require a high instantaneous power but also a low average power on the lap (when it comes to racing cars).

Moreover, being in a competition environment, the mass of the actuator also plays a crucial role and must be as low as possible.

PRESENTATION OF THE INVENTION

In the known solutions, therefore, always in the field of racing cars, the need for high instantaneous powers and low power supply voltages, leads to electrical components of large size and mass, not very suitable for racing applications.

This, therefore, reveals a glaring technical contradiction: to have the performance required, the components are too massive, while, with acceptable masses, the components are able to provide the required actuation powers.

Therefore, there is a need to solve the drawbacks and limitations mentioned in reference to the known art, namely there is a need to provide a braking system that ensures high power, reduced actuation times and, at the same time, components having small masses so as not to affect the performance of the vehicles on which such systems are installed.

In addition, for obvious safety reasons, automatic control braking systems must always ensure the maximum efficiency and reliability even in case of malfunction of the automatic control and/or the electrical circuit. Therefore, there is also felt the need to make available a braking system that always ensures reliability and correct braking in case of electrical malfunction.

These needs are met by an automatic control braking system for vehicles according to claim 1.

In particular, this need is met by a braking system for vehicles comprising a master cylinder, at least one braking device, the master cylinder being provided with a first and a second output circuit, containing respectively, a first and second brake fluid, wherein the first output circuit is fluidically connected to said at least one braking device for its actuation, an automatic hydraulic actuation unit operatively connecting the master cylinder by means of a hydraulic actuation circuit (22) traversed by an actuation fluid different from the first and the second brake fluid, at least one processing and control unit of the system (52) that supervises the operation of the braking system (4), characterised in that the master cylinder (8) comprises a pump body that houses a first and a second float fluidically connected respectively to the first and second output circuits (12,14) and mobile along respective actuation strokes parallel to an axial direction X-X, wherein the first float (32) is operatively connected to a manual actuation device, and the second float is operatively connected to the automatic hydraulic actuation unit to be operated by the hydraulic actuation circuit.

According to an embodiment, the first and second float are interconnected so that, in a condition of automatic operation of the braking system, a first actuating stroke of the first float is less than or equal to a second actuating stroke of the second float.

According to an embodiment, the first float slides coaxially at least partially inside the second float.

According to an embodiment, the first float (32) is provided with an undercut with respect to an actuation direction of said first and second actuating strokes, the undercut being configured to drag with it in translation the second float so that the first actuating stroke of the first float is always less than or equal to the second actuating stroke of the second float.

According to an embodiment, the first float is provided with a first pumping head slidingly housed inside a first output volume, the second float is provided with a second pumping head slidingly housed inside a second output volume, said first and second output volume being fluidically separated from each other.

According to an embodiment, the pump body, the first float and the second float are sized so that the absorption of hydraulic fluid in the first delivery volume is less than the absorption of brake fluid in the at least one braking device, in a condition of automatic operation of the system.

According to an embodiment, the pump body defines an actuation chamber, fluidically connected to the hydraulic actuation circuit and housing an actuation head of the second float for the hydraulic actuation of the second float.

According to an embodiment, the actuation chamber and the second output volume are fluidically separated from each other and filled with fluids distinct from each other.

According to an embodiment, the processing and control unit is programmed so that, in a condition of automatic operation, following the actuation of the manual actuation device that causes the translation of the first float by a first actuating stroke, the automatic hydraulic actuation unit sends fluid under pressure to translate the second float by a second actuating stroke, greater than the first actuating stroke.

According to an embodiment, the first output circuit is equipped with a first control valve operatively connected to the processing and control unit and controlled thereby so that, in a condition of automatic operation, the first pressurised brake fluid in the first output circuit is sent to said braking simulator.

According to an embodiment, the first output circuit has a first control valve operatively connected to the processing and control unit and controlled thereby so that, in a condition of manual operation, the first brake fluid in the first output circuit is sent to a brake fluid tank of the master cylinder, by-passing said braking simulator and cancelling out the pressure in the first output circuit.

According to an embodiment, the first and the second brake fluids are of the same type and fluidically connected to each other by means of said brake fluid tank of the master cylinder.

According to a form of embodiment, the automatic hydraulic actuation unit comprises a high pressure pump suitable to pressurise the actuation fluid at a pressure of at least an order of magnitude higher than the pressure inside the second output circuit, for the actuation of the second float.

According to an embodiment, the automatic hydraulic actuation unit comprises a second control valve operatively connected to the processing and control unit and controlled by this so that, in a condition of manual operation, the second control valve is closed to hydraulically disconnect the automatic hydraulic actuation unit from the second float.

According to an embodiment, the braking simulator is equipped with a hydraulic pressure sensor operatively connected to the processing and control unit so as to indicate to the latter the user's braking action request.

According to an embodiment, the braking simulator comprises an accumulator tank of hydraulic fluid and elastic means for elastically opposing the first actuating stroke of the first float.

DESCRIPTION OF THE DRAWINGS

Further characteristics and advantages of this invention will be more understandable from the following description of its preferred and non-limiting examples of embodiments, in which.

The elements, or parts of elements, in common between the embodiments described below will be indicated with the same reference numbers.

DETAILED DESCRIPTION

Figure 1:
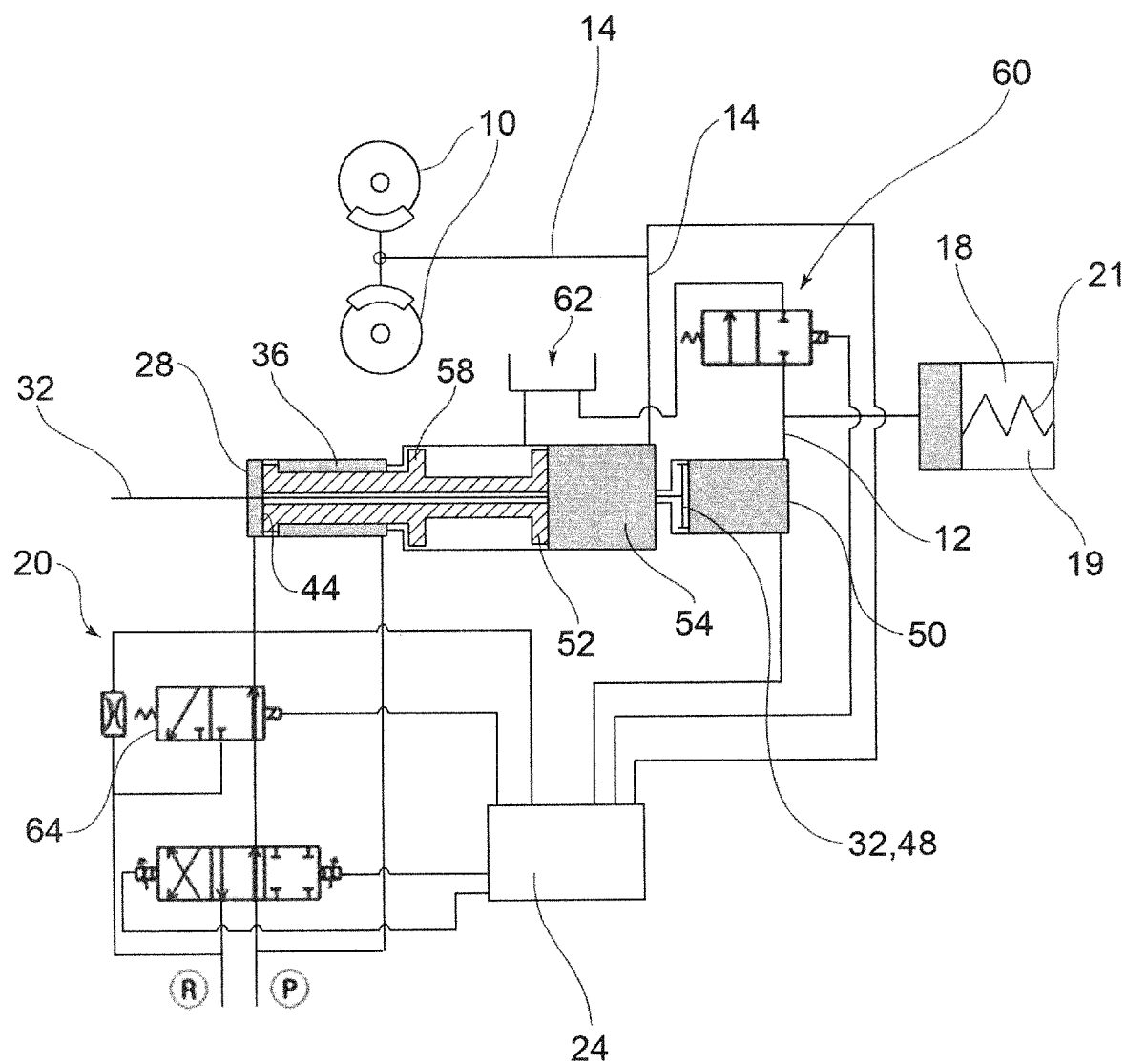
FIG. 1 is a schematic view of a braking system according to this invention, in a first operating condition or automatic operation condition.
Figure 2:
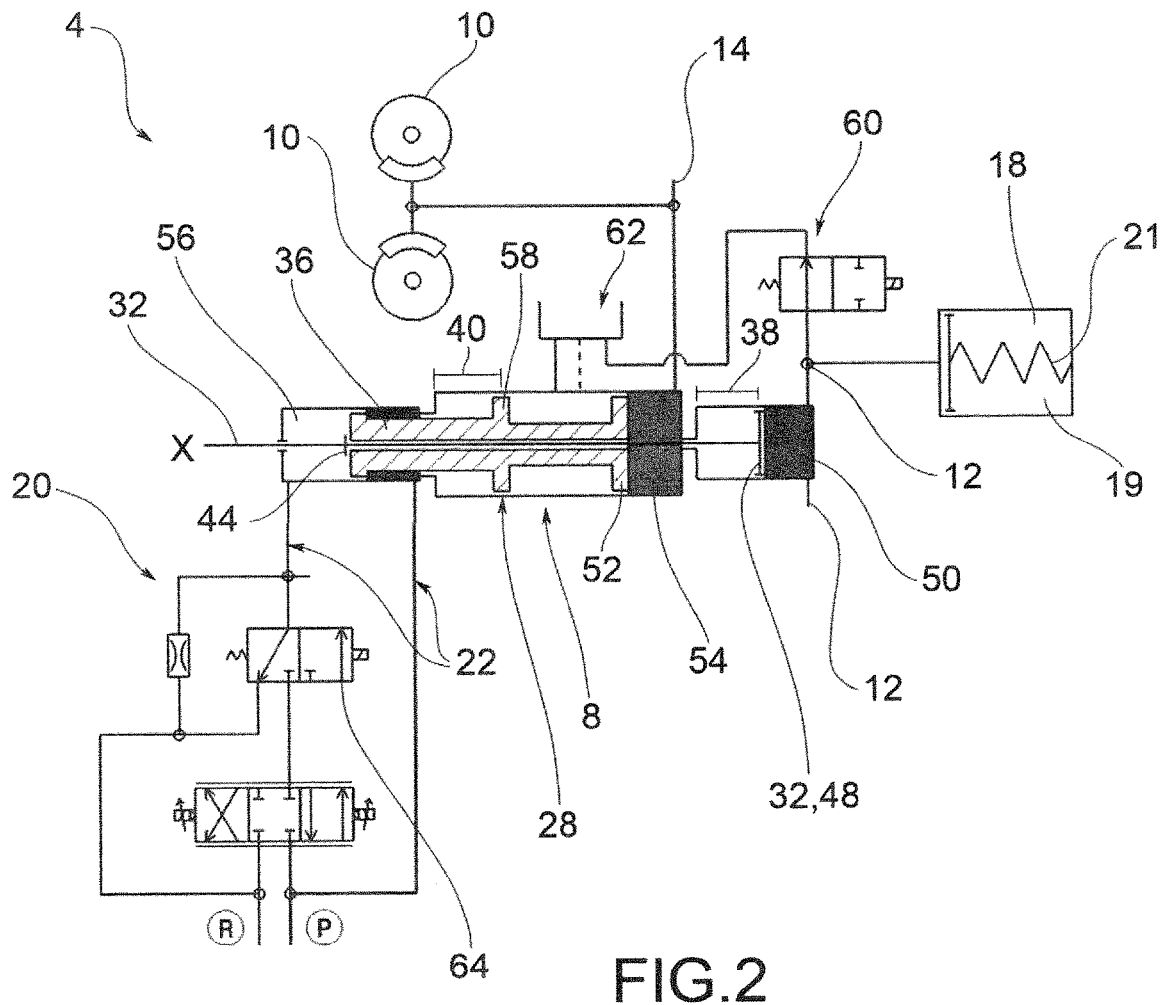
FIG. 2 is a schematic view of the braking system of FIG. 1, in a second operating condition or manual operating condition.
Figure 4:
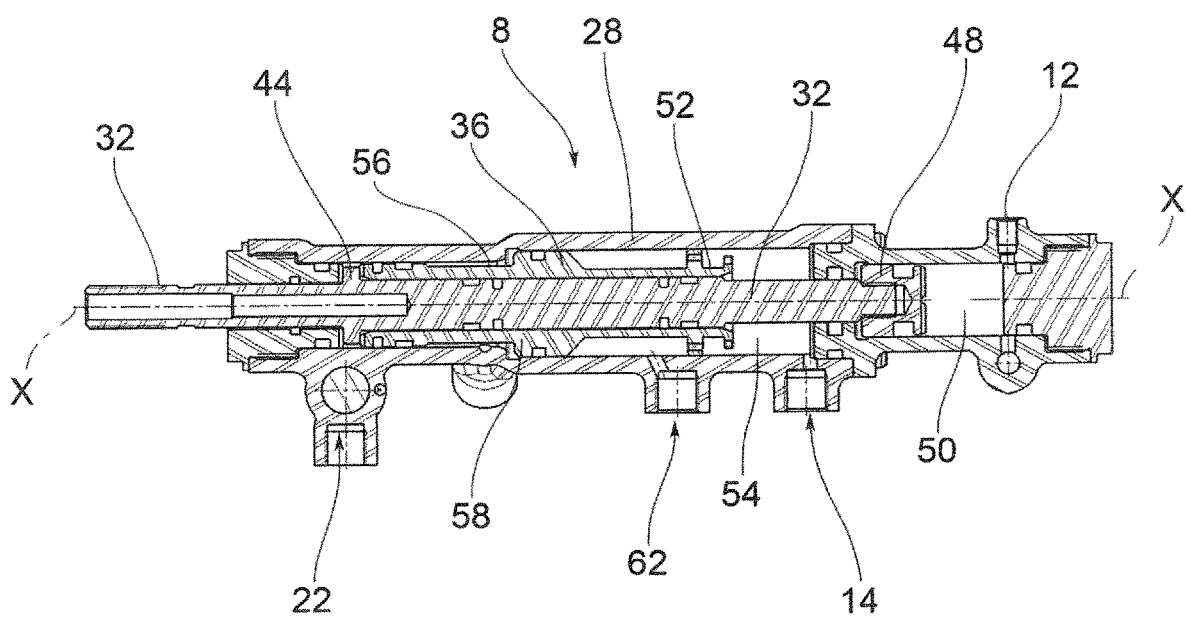
FIG. 4 is a sectional view of the master cylinder of FIG. 3.
Figure 3:
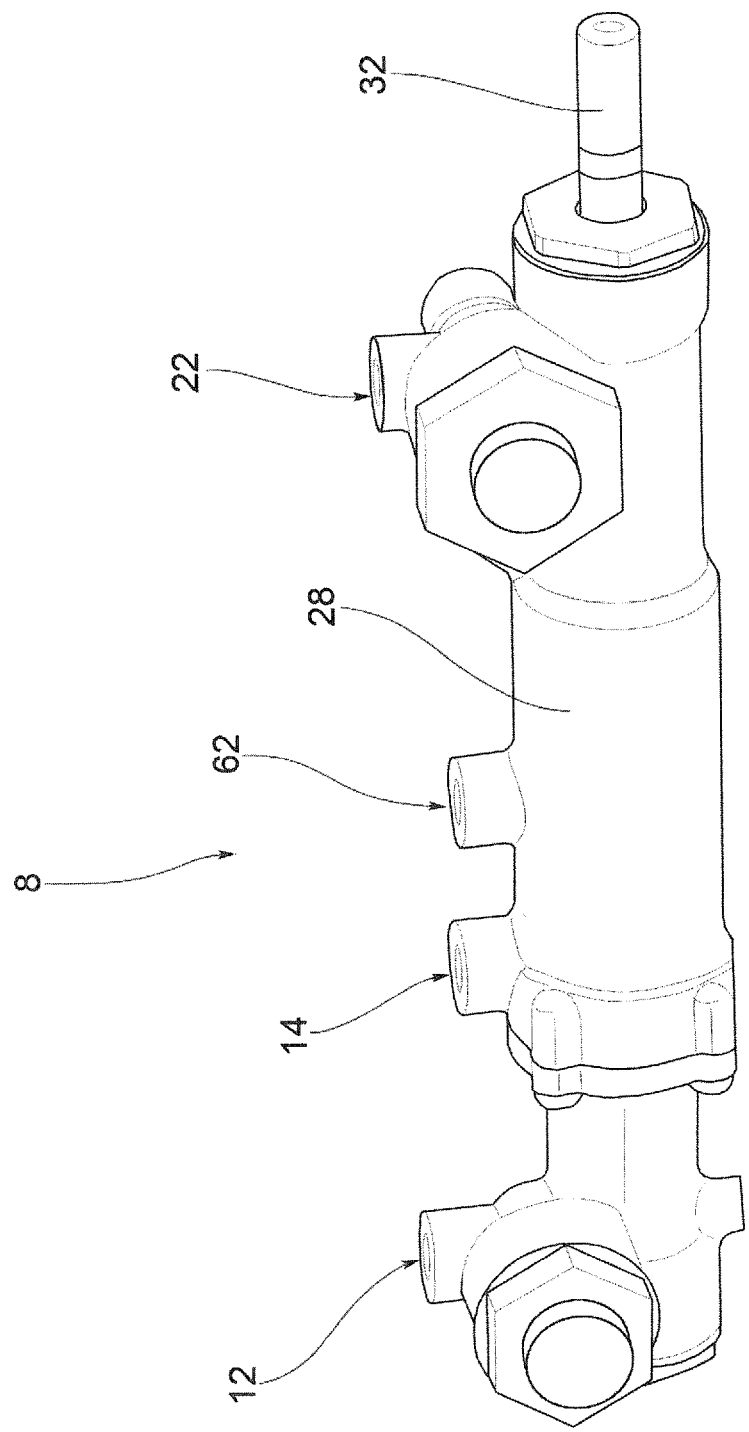
FIG. 3 is a perspective view of a master cylinder according to an embodiment of this invention.

With reference to the above figures, the reference number 4 globally indicates a braking system for vehicles.

First, for the purposes of this invention, it is necessary to specify that, by vehicles is meant, in general, motor vehicles, of any type, size and power, with two, three, four or more wheels, as well as two or more related axles; it is then obvious that this invention preferably, although not exclusively, refers to high-performance four-wheel vehicles, as explained in the introductory part.

The braking system for vehicles 4 comprises a master cylinder 8 and at least one braking device 10.

For the purposes of this invention, the type of braking device 10 used is irrelevant since it can be, preferably but not exclusively, a calliper for a fixed or floating type disc brake in a single piece or two half-callipers connected to each other and so on.

The master cylinder 8 is provided with a first and a second output circuit 12,14, respectively containing a first and second brake fluid.

For example, the brake fluid of the first output circuit 12 and/or of the second output circuit 14 is a typical brake fluid known in the art having, preferably, characteristics for use in high-performance systems. This brake fluid is of the synthetic type, characterised by high hygroscopicity and high resistance to bubble formation to prevent fading phenomena. Such fluid ensures high reliability in the actuation of the braking device 10.

The first output circuit 12 is fluidically connected to a braking simulator 18 and the second output circuit 14 is fluidically connected to said at least one braking device 10 for its actuation.

According to an embodiment, the braking simulator 18 is a hydraulic accumulator suitable to receive and store the first brake fluid received from the first output circuit 12.

The braking system 4 according to this invention also comprises an automatic hydraulic actuation unit 20 operatively connected to the master cylinder 8 by means of a hydraulic actuation circuit traversed by an actuation fluid different from the first and the second brake fluid.

The actuation fluid of the hydraulic actuation circuit 22 is preferably a mineral fluid particularly suitable to working at much higher pressures, on the order of several hundreds of bar.

The braking system 4 also comprises a processing and control unit 24 of the system 4 that, as better explained below, supervises the operation of the braking system 4.

Advantageously, the master cylinder 8 comprises a pump body 28 that houses a first float and a second float 32,36 fluidically connected respectively to the first output circuit 12 and to the second output circuit 14, and mobile along respective actuating strokes parallel to an axial direction X-X.

In particular, the first float 32 is operatively connected to a manual actuation device (not shown). For example, the manual actuation device can comprise an actuation lever or pedal, in a known manner. In this way the axial displacement of the first float 32 is obtained manually by the user through the manual operating device.

The second float 36 is operatively connected to the automatic hydraulic actuation unit 20 to be actuated by the hydraulic actuation circuit 22. Therefore, in automatic operation condition, the user manually translates the first float 32 of a first actuating stroke 38, and the automatic hydraulic actuation unit 20 automatically moves the second float 36 of a second actuating stroke 40 so as to pressurise the second output circuit 14 and actuate the at least one braking device 10. Therefore, in automatic operating condition, the user has no direct control of the second float 36 that actuates the braking device 10, but is limited to translating the first float 32 receiving an elastic reaction from the braking simulator 18.

Preferably, the braking simulator 18 is equipped with a pressure transducer, operatively, connected to the processing and control unit 24 so as to indicate to the latter the user's braking action request.

In this condition, braking simulator 18 has the function of allowing a specific actuating stroke of the manual actuator actuated by the user and thus the first actuating stroke 38 of the first float 32, and to return to the user a sensation of gradually increasing resistance so as to allow him to modulate the desired braking, as in a conventional braking system.

For example, to this purpose, the braking simulator 18 comprises an accumulator tank 19 of hydraulic fluid and elastic means 21 for elastically opposing the first actuating stroke 38 of the first float 32.

The first float 32 and the second float 36 are interconnected so that, in a condition of automatic operation of the braking system, a first actuating stroke 38 of the first float is less than or equal to a second actuating stroke 40 of the second float 36.

Preferably, the first float 32 slides coaxially at least partially inside the second float 36.

Preferably, the first and the second float 32,36 are coaxial and axisymmetric with respect to an axial direction X-X.

According to an embodiment, the first float 32 is provided with an undercut 44 with respect to an actuation direction of said first and second actuating stroke 38,40.

The undercut 44 is configured to drag with it in translation the second float 36 so that the first actuating stroke 38 of the first float 32 is always less than or equal to the second actuating stroke 40 of the second float 36.

The undercut 44 can for example be realised by means of a shoulder, for example in a ring shape.

Thanks to this geometric relationship between the first and second actuating stroke 38,40 ensures a conservative type braking action, in automatic operating condition of the system, since the second actuating stroke 40, which is the one that actually implements the braking action on the braking device 10, is always greater (and thus not less) than the first actuating stroke 38 obtained by the user through the manual actuation device.

In addition, the undercut 44 ensures the safety of braking even in case of malfunction of the automatic system and, thus of operating in manual condition. In fact, in case of malfunction of the automatic hydraulic actuation unit 20, due to which there would be no movement and, therefore, the second actuating stroke 40 of the second float 36, which is essential for pressurising the second output circuit 14, and thus for actuating the braking device 10, the undercut 44 allows the user to brake manually.

In fact, in the moment in which the first float 32 translates under the manual thrust of the manual actuation device, and the second float 36 does not receive the hydraulic thrust from the hydraulic actuation circuit 22, the undercut 44 drags in translation also the second float 36 that is thus able to keep the second output circuit 14 under pressure and thus actuate the braking device 10.

According to an embodiment, the first float 32 is equipped with a first pumping head 48 is slidingly housed in a first output volume 50.

The second float 36 is equipped with a second pumping head 52 slidingly housed in a second output volume 54.

Said first and second output volume 50,54 are fluidically separated from each other.

The pump body 28, the first float 32 and the second float 36 are sized so that the absorption of hydraulic fluid in the first output volume 50 is less than the absorption of brake fluid in the at least one braking device 10, in a condition of automatic operation of the braking system 4.

The pump body 28 also defines an actuation chamber 56, fluidically connected to the hydraulic actuation circuit 22 and housing an actuation head 58 of the second float 36 for the hydraulic actuation of the second float 36.

In other words, the second float 36 comprises, integrally, an actuation head 58 and a second pumping head 52: the actuation head 58 receives the thrust of the actuation fluid in the actuation chamber 56. This thrust is transmitted through the second pumping head 52 to the second output circuit that is pressurised and, in this way, actuates the braking device 10.

In this manual operating condition, the valve 60 opens so as not to pressurise the chamber 50 and leave the user's operating force exclusively linked to the thrust of float 52.

The actuation chamber 56 and the second output volume 54 are fluidically separated from each other and filled with fluids distinct from each other.

As seen, the processing and control unit is programmed so that, in a condition of automatic operation, following the actuation of the manual actuation device that causes the translation of the first float 32 by the first actuating stroke 38, the automatic hydraulic actuation unit 20 sends fluid under pressure to translate the second float 36 by a second actuating stroke, greater with respect to the first actuating stroke 38.

Preferably, the first output circuit 12 is equipped with a first control valve 60 operatively connected to the processing and control unit 24 and controlled thereby so that, in a condition of automatic operation, the first pressurised brake fluid in the first output circuit 12 is sent to said braking simulator 18.

In case of malfunction of the automatic system, the system brings itself in condition of manual operation: in particular, the first control valve 60 is operatively connected to the processing and control unit and controlled thereby so that, in a condition of manual operation, the first brake fluid in the first output circuit 12 is sent to a brake fluid tank 62 of the master cylinder 8, by-passing said braking simulator 18 and cancelling out the pressure in the first output circuit 12.

The brake fluid tank 62 is a reservoir that contains brake fluid and is fluidically connected to the second output volume 54, in a known manner, so as to insert into said second output volume a volume of brake fluid that compensates for the incremental wear of the friction material of the braking device 10.

As seen, in manual operation, the processing and control unit 24 acts on the first control valve 60 so that the brake fluid in the first output circuit 12 is sent to the brake fluid tank 62 of the master cylinder 8, by-passing said braking simulator 18 and cancelling out the pressure in the first output circuit 12. In this way, in case of malfunction, the user will not have to overcome the resistance of the braking simulator 18 but may directly actuate the braking device 10 through the second float 36 which is dragged in translation by the first float 32 moved by the manual actuation device. Therefore, the user will not have to exert excessive action on the manual actuation device even in case of malfunction of automatic operation.

Preferably, the first and the second brake fluids are of the same type and fluidically connected to each other by means of said brake fluid tank 62 of the master cylinder 8.

According to an embodiment, the automatic hydraulic actuation unit 20 comprises a high pressure pump (not shown) suitable to pressurise the actuation fluid at a pressure of at least an order of magnitude higher than the pressure inside the second output circuit 14, for the actuation of the second float 36.

According to an embodiment of this invention, the automatic hydraulic actuator unit 20 comprises an auxiliary circuit of the vehicle for the control of the auxiliary devices of the vehicle. Such auxiliary devices can include both vehicle accessories such as, for example, an actuation system of the distribution of the propulsion unit, power supply systems of the propulsion unit and the like.

For example, in certain categories of "top racing" vehicles (e.g., F1), the cars are equipped with a high-pressure hydraulic system that can be exploited, as the power generation unit, for the actuation of the braking devices.

In other categories, for design or regulatory choices, a high-pressure hydraulic system is not present on the vehicle and actuation can be performed using electrical and, in particular, electro-hydraulic systems.

For example, according to a possible embodiment, the automatic hydraulic actuation unit 20 comprises at least one motor operatively connected to a pump for pressurising the actuation fluid. The motor can also be replaced by a power take-off operatively connected, for example, to a drive shaft or auxiliary shaft of the propulsion unit of the associable vehicle on which the braking system 4 is mounted.

Preferably, said automatic hydraulic actuator unit 20 is an electro-hydraulic unit, in which the motor is an electric motor.

According to an embodiment, the automatic hydraulic actuation unit 20 comprises a second control valve 64 operatively connected to the processing and control unit 24 and controlled by this so that, in a condition of manual operation, the second control valve 64 is closed to hydraulically disconnect the automatic hydraulic actuation unit 20 from the second float 36 and the actuation chamber 56.

As can be appreciated from the description, the braking system for vehicles according to the invention allows overcoming the drawbacks presented in the prior art.

In particular, the brake system for vehicles according to this invention allows solving the technical contradiction of the systems of the prior art, which consists in the fact that, to obtain the required performance, the components are too massive while, with acceptable masses, the components are unable to provide the required actuation powers.

The proposed solution also allows exploiting the advantage of a hydraulic application even on vehicles not equipped with a high-pressure hydraulic system: in fact, for such vehicles it is possible to use a specific electro-hydraulic unit able to pressurise a fluid pressure suitable to operate the actuators of the braking devices.

The braking system according to this invention ensures safe conditions; in fact, in case of malfunction of the automatic hydraulic actuation unit, the system automatically passes to the manual operating condition, i.e., to a condition of safety, in which it ensures direct manual control of the braking devices by the user, through the actuation of the manual actuator device.

Under standard conditions, i.e., in the automatic operating condition, the system provides "BBW" or "brake-by-wire" operation in such a way as to obtain fast, powerful and reliable braking that always meets the request for braking torque that the user makes by operating the manual actuator.

Furthermore, this present invention provides a simplified hydraulic diagram, for equality of operating mode, with respect to the BBW system solutions of the known art.

Moreover, this invention provides a single component for all functions of the BBW system, including the hydraulic pump actuated by the driver. This reduces the costs, weights and dimensions of the braking system.

This solution also allows incorporating the driver hydraulic pump and installing everything on the e the pilot hydraulic pump and installing it all on the pedal assembly, with consequent simplification of the system.

Obviously, the system according to this invention can be easily and advantageously supplemented with additional operating functions such as, for example, the automatic management of braking to avoid locking phenomena (ABS).

A person skilled in the art, in order to satisfy contingent and specific needs, may make numerous modifications and variations to the braking systems described above, all however contained within the scope of the invention as defined by the following claims.

The invention claimed is:

1. A braking system for vehicles, comprising:
   a master cylinder,
   at least one braking device,
   the master cylinder being provided with a first and a second output circuit, containing respectively a first and a second brake fluid, wherein the first output circuit is fluidically connected to a braking simulator and the second output circuit is fluidically connected to said at least one braking device for the actuation thereof,
   an automatic hydraulic actuation unit operatively connecting the master cylinder by a hydraulic actuation circuit traversed by an actuation fluid different from the first and the second brake fluid,
   at least one processing and control unit of the system which supervises the operation of the braking system,
   wherein
   the master cylinder comprises a pump body which houses a first and a second float fluidically connected respectively to the first and second output circuits and mobile along respective actuation strokes parallel to an axial direction,
   wherein the first float is operatively connected to a hand-operated device, and the second float is operatively connected to the automatic hydraulic actuation unit to be operated by the hydraulic actuation circuit;
   wherein the first float slides at least partly coaxially inside the second float.

2. The braking system for vehicles according to claim 1, wherein the first and second float are interconnected so that, in a condition of automatic operation of the braking system, a first actuating stroke of the first float is less than or equal to a second actuating stroke of the second float.

3. The braking system for vehicles according to claim 1, wherein the first float is provided with an undercut in an actuation direction of said first and second actuating strokes, the undercut being configured to drag with it in translation the second float so that the first actuating stroke of the first float is always less than or equal to the second actuating stroke of the second float.

4. The braking system for vehicles according to claim 1, wherein the first float has a first pump head housed so as to slide in a first delivery volume, the second float is provided with a second pump head housed so as to slide in a second delivery volume, said first and second delivery volumes being fluidically separate from each other.

5. The braking system for vehicles according to claim 4, wherein the pump body, the first float and the second float are sized so that the absorption of hydraulic fluid in the first delivery volume is less than the absorption of brake fluid in the at least one braking device, in a condition of automatic operation of the braking system.

6. The braking system for vehicles according to claim 4, wherein the pump body identifies an actuation chamber, fluidically connected to the hydraulic actuation unit and housing an actuation head of the second float for the hydraulic operation of the second float.

7. The braking system for vehicles according to claim 6, wherein the actuation chamber and the second delivery volume are fluidically separate from each other and filled with different fluids from each other.

8. The braking system for vehicles according to claim 1, wherein the processing and control unit is programmed so that, in a condition of automatic operation, following the actuation of the manual actuation device which causes the translation of the first float by a first actuating stroke, the automatic hydraulic actuation unit sends fluid under pressure to translate the second float by a second actuating stroke, greater than the first actuating stroke.

9. The braking system for vehicles according to claim 1, wherein the first output circuit has a first control valve operatively connected to the processing and control unit and controlled thereby so that, in a condition of automatic operation, the first pressurised brake fluid in the first output circuit is sent to said braking simulator.

10. The braking system for vehicles according to claim 1, wherein the first output circuit has a first control valve operatively connected to the processing and control unit and controlled thereby so that, in a condition of manual operation, the first brake fluid in the first output circuit is sent to a brake fluid tank of the master cylinder, by-passing said braking simulator and cancelling out the pressure in the first output circuit.

11. The braking system for vehicles according to claim 10, wherein the first and the second brake fluids are of the same type and fluidically connected to each other by means of said brake fluid tank of the master cylinder.

12. The braking system for vehicles according to claim 1, wherein the automatic hydraulic actuation unit comprises a high pressure pump suitable to pressurise the actuation fluid at a pressure of at least an order of magnitude higher than the pressure inside the second output circuit, to actuate the second float.

13. The braking system for vehicles according to claim 1, wherein the automatic hydraulic actuation unit comprises a second control valve operatively connected to the processing and control unit and controlled thereby so that, in a situation of manual operation, the second control valve is closed, to hydraulically disconnect the automatic hydraulic actuation unit from the second float.

14. The braking system for vehicles according to claim 1, wherein the braking simulator is provided with a hydraulic pressure sensor operatively connected to the processing and control unit to notify the latter of the request for a braking action by a user.

15. The braking system for vehicles according to claim 1, wherein said braking simulator comprises a storage tank of hydraulic fluid, and elastic means to elastically oppose the first actuating stroke of the first float.

* * * * *